United States Patent [19]

Miller et al.

[11] Patent Number: 5,013,064
[45] Date of Patent: May 7, 1991

[54] OCCUPANT RESTRAINT SYSTEM

[75] Inventors: Gregory A. Miller, Troy; Jeffery L. Pearson, Rochester, both of Mich.

[73] Assignee: General Motors Corporation, Detroit, Mich.

[21] Appl. No.: 529,799

[22] Filed: May 29, 1990

[51] Int. Cl.⁵ .............................................. B60R 21/22
[52] U.S. Cl. .................................. 280/730; 280/731; 280/743
[58] Field of Search ............... 280/728, 730, 731, 732, 280/733, 743

[56] References Cited

U.S. PATENT DOCUMENTS

| | | | |
|---|---|---|---|
| 3,819,205 | 6/1974 | Dunford et al. | 280/731 |
| 3,907,330 | 9/1975 | Kondo et al. | 280/731 |
| 4,101,146 | 7/1978 | Oehm | 280/743 X |
| 4,111,457 | 9/1978 | Kob et al. | 280/743 X |
| 4,148,503 | 4/1979 | Shiratori et al. | 280/731 |
| 4,235,453 | 11/1980 | Lawson et al. | 280/743 |
| 4,286,954 | 9/1981 | McArthur et al. | 280/743 X |
| 4,325,568 | 4/1982 | Clark et al. | 280/731 |
| 4,334,699 | 6/1982 | Patzelt et al. | 280/731 |
| 4,785,144 | 11/1988 | Fosnaugh et al. | 280/731 |
| 4,903,986 | 2/1990 | Cok et al. | 280/731 |

Primary Examiner—Charles A. Marmor
Assistant Examiner—Tamara L. Finlay
Attorney, Agent, or Firm—Herbert Furman

[57] ABSTRACT

A container for the folded cushion of an occupant restraint system is of generally rectangular shape and includes an elongated I-shaped tear line configuration which permits the longer side walls of the container to open outwardly about their secured lower edges for deployment of the cushion along an alternate path laterally of the container should the cushion be unable to deploy along a normal path toward the driver through oppositely opening flaps of the base wall of the container.

4 Claims, 3 Drawing Sheets

OCCUPANT RESTRAINT SYSTEM

This invention relates to occupant restraint systems for vehicle drivers which permit initial deployment of the cushion along paths laterally of the driver should the cushion be unable to deploy along the normal or desired path toward the driver.

U.S. Pat. No. 4,903,986, Cok et al., filed Nov. 14, 1988 and assigned to the assignee of this invention, discloses a number of different embodiments of occupant restraint systems wherein the container for the folded occupant restraint cushion has its longer side walls and upper or base wall provided with tear lines to provide two sets of flaps. The one or first set of flaps permits deployment of the cushion through the base wall of the container along a desired or intended path of deployment toward the driver upon inflation of the cushion. The other or second set of flaps permits initial deployment of the cushion through portions of the longer or 6 and 12 o'clock side walls of the container along alternate paths parallel to the driver should the cushion be unable to deploy along its desired or intended path of deployment.

The folded occupant restraint cushion includes a diametrical portion located underneath and opposite the base wall of the container, fan folded chordal portions located opposite the longer or 6 and 12 o'clock side walls of the container, and pleat folded end portions located opposite the shorter or 3 and 9 o'clock end walls or side walls of the container.

The system of this invention includes the same components as the system disclosed in the Cok et al. application. However, the container includes a modified tear line configuration or pattern dividing the base wall and the side walls of the container into two sets of flaps. A generally elongated I-shaped tear line configuration includes a pair of first tear lines, each having a major portion located in the base wall of the container generally parallel to and adjacent the juncture of the base wall with the upper edge of a respective outwardly flared or angular longer side wall. The major portions of the first tear lines each include continuation or end extensions which cross the junctures of the shorter walls with the base walls and extend across the outwardly flared or angular shorter walls to adjacent the secured or lower edge portions thereof. In one modification, the extensions are coplanar with the major portions of the tear lines and are located adjacent the corner junctures of the shorter walls with the longer walls. Alternatively, the extensions may follow the peak lines or the areas of the angular corner junctures between the longer and shorter side walls. The extensions may also be provided by cutting away or removing all or part of such corner junctures. In all such modifications, the tear lines and extensions permit the entire longer side walls of the container to fold outwardly about the secured or lower edge portions thereof to provide the second or other set of flaps. The major portions of the first tear lines are connected by a second tear line located generally intermediate the shorter side walls of the base wall of the container to complete the elongated I-shaped tear in configuration. The second tear line and the major portions of the first tear lines provide the container with the first or one set of flaps. The first flaps are hinged to the container about the junctures thereof with the shorter side walls and open oppositely of each other. The first flaps permit deployment of the cushion along the desired or intended path when the major portions of the first tear lines and the second tear line are severed and the first flaps are moved to open position by the diametrical portion of the cushion upon inflation of the cushion.

Each second or other flap, in all modifications of the end extensions of the major portions of the first tear lines, is comprised of an entire longer side wall of the container, any parts of the corner junctures joined to the longer side walls, and the portion of the base wall between a respective first tear line and the upper edge of a respective longer side wall. Each second flap is hinged to the container about the lower or secured edge portion of a longer side wall and is located opposite a fan folded chordal portion of the cushion. When the cushion is inflated and is unable to initially deploy along its desired path through the first flaps, the fan folded chordal portions of the cushion sever and move the second flaps to open position to permit initial deployment of the cushion parallel to the driver.

Should the cushion initially deploy through the second set of flaps, parallel to of the driver, the end extensions of the major portions of the first tear lines will be initially severed. When the cushion subsequently deploys toward the driver along its normal or intended path, the portions of the shorter side walls between the end extensions will deploy as a unit with their respective first flaps to provide enlarged first flaps which open outwardly and oppositely of each other about the lower or secured edge portions of the shorter side walls. Once the end extensions are severed, the junctures of the shorter side walls with the base walls will effectively prevent the first flaps from pivoting relative to the shorter side walls and force the unitized and enlarged first flaps to pivot about the lower or secured edge portions of the shorter side walls.

The primary feature of this invention is that it provides a generally rectangularly shaped box-like container for an occupant restraint system having a base wall and longer and shorter side walls and provided with elongated I-shaped tear line configuration which provides outwardly and oppositely opening first and second pairs of flaps, each flap of the second pair including an entire longer side wall of the container and opening outwardly about the secured or lower edge portion thereof to permit deployment of the cushion along an alternate path generally parallel to the driver and laterally of the container should the cushion be unable to deploy along a normal path toward the driver through the first pair of flaps which include portions of the base wall of the container and which open oppositely of each other about their junctures with the shorter side walls of the container. Another feature is that the I-shaped tear line configuration includes a pair of first tear lines having major portions in the base wall of the container and continuations or end extensions which cross the junctures of the base wall with the shorter side walls and extend to adjacent the secured or lower edge portions of the shorter side walls. A further feature is that the end extensions and major portions are coplanar. Yet another features is that the shorter side walls are flared relative to the base wall and the end extensions follow the angular juncture of the shorter side walls with the longer side walls. Yet a further feature is that the shorter side walls can open as a unit with the first pair of flaps about the lower or secured edge portions of the shorter side walls should the cushion initially deploy through the second set of flaps.

These and other features of the invention will be apparent from the following specification and drawing wherein.

Figure 1:
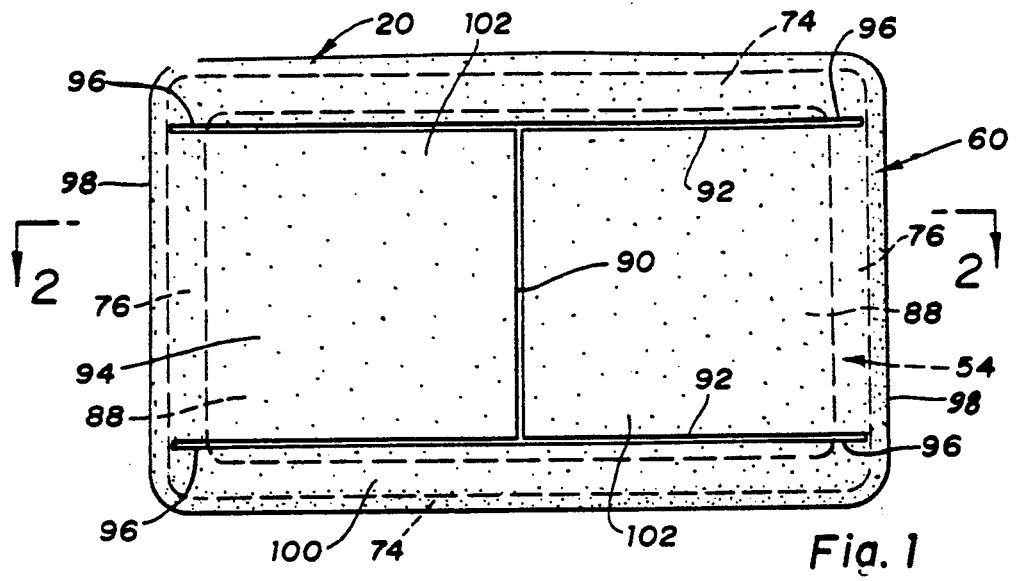
FIG. 1 is a top plan view of an occupant restraint system according to this invention.
Figure 2:
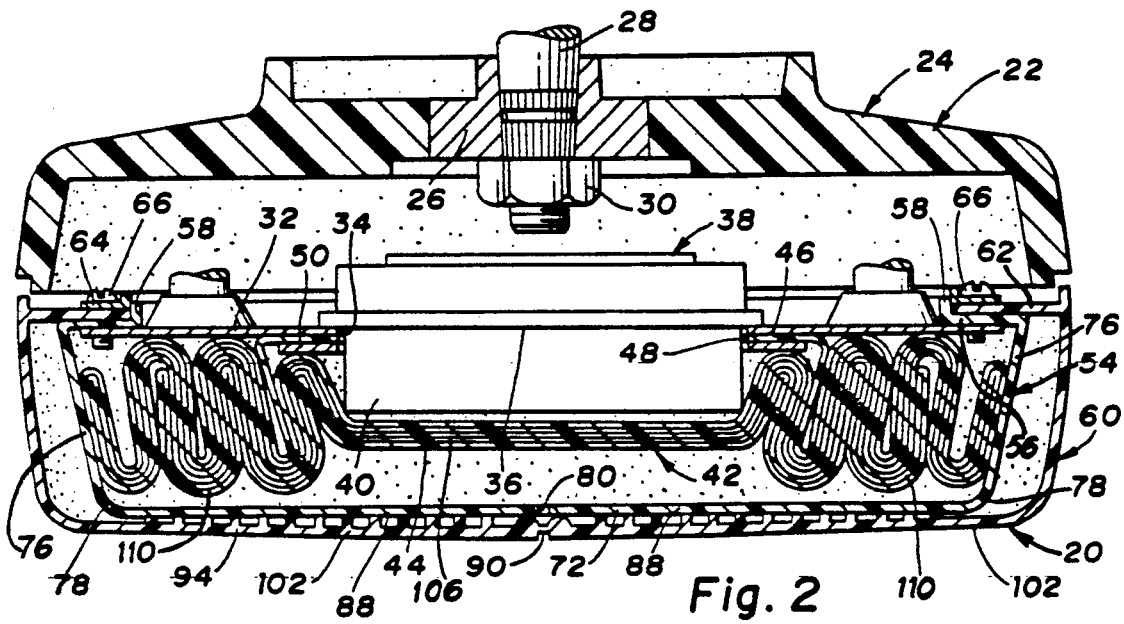
FIG. 2 is an enlarged sectional view taken along line 2—2 of FIG. 1.
Figure 3:
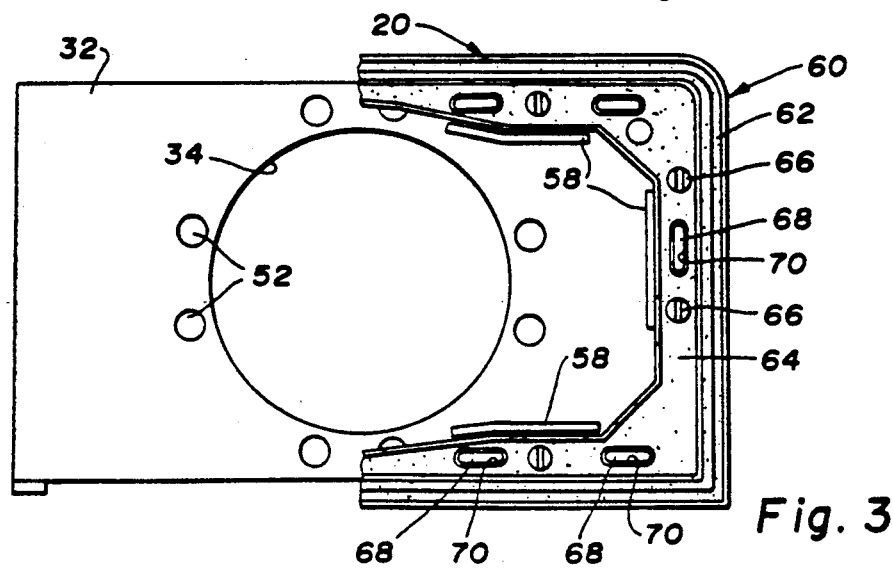
FIG. 3 is a partial bottom plan view.

Referring now to FIGS. 1 through 3 of the drawings, a modular occupant restraint system 20 is shown mounted in a conventional manner to the hub portion 22 of a vehicle steering wheel 24. The hub portion includes a splined bushing 26 which receives the upper splined end of the vehicle steering shaft 28 and is bolted thereto at 30 to secure the steering wheel to the vehicle steering system.

A generally rectangularly shaped support or plate 32 has a central circular opening 34. The flange 36 of a conventional inflator 38 seats against the lower side of the plate 32 and is secured thereto in a conventional manner. The upper outlet portion 40 of the inflator projects through the plate 32 and into the interior of a folded inflatable driver restraint cushion 42 of conventional construction. The cushion 42 includes upper and lower or forward and rearward circular members 44 and 46 which are secured together at their circular edge portions. The upper or forward cushion member 44 provides the impact surface of the cushion for the driver when the cushion is inflated, and the lower or rearward cushion member 46 has a central opening 48 which receives the upper outlet portion 40 of the gas generator therethrough. A ring 50 is fastened at 52 to the plate 32 around the opening 34 therein to clamp the cushion member 46 to the plate 32 around the opening 48 therethrough.

The inflator 38 is a gas generator which is electrically actuated from a conventional electrical power source when acceleration or velocity or other type sensors sense the impact of the vehicle with an obstacle or the possibility or probability of such an impact. Such sensors and the circuits connecting the sensors to a power source are well known in the art. Likewise, inflators of the gas generating type are also well known in the art.

A container 54 for the cushion 42 is formed of plastic material and has a generally box-like rectangular shape. The container 54 houses the folded cushion 42 and has a flange 56 which underlies the plate 32 and has lateral flange segments 58 therealong, FIGS. 2 and 3. An outer decorative cover 60 of flexible plastic material is of the same general shape as the container 54. The cover 60 has a flange 62 which overlies the flange 56 of the container. A retainer 64 overlies the flange 62 and is fastened at 66 to the support plate 32 to secure the container and cover to the support plate. The flange 62 of the cover has lateral nubs or projections 68 which are received in openings 70 of the retainer 64. The plate 32 thus mounts the inflator 38, the cushion 42, the container 54, and the cover 60 to provide the modular restraint system 20.

Figure 4:
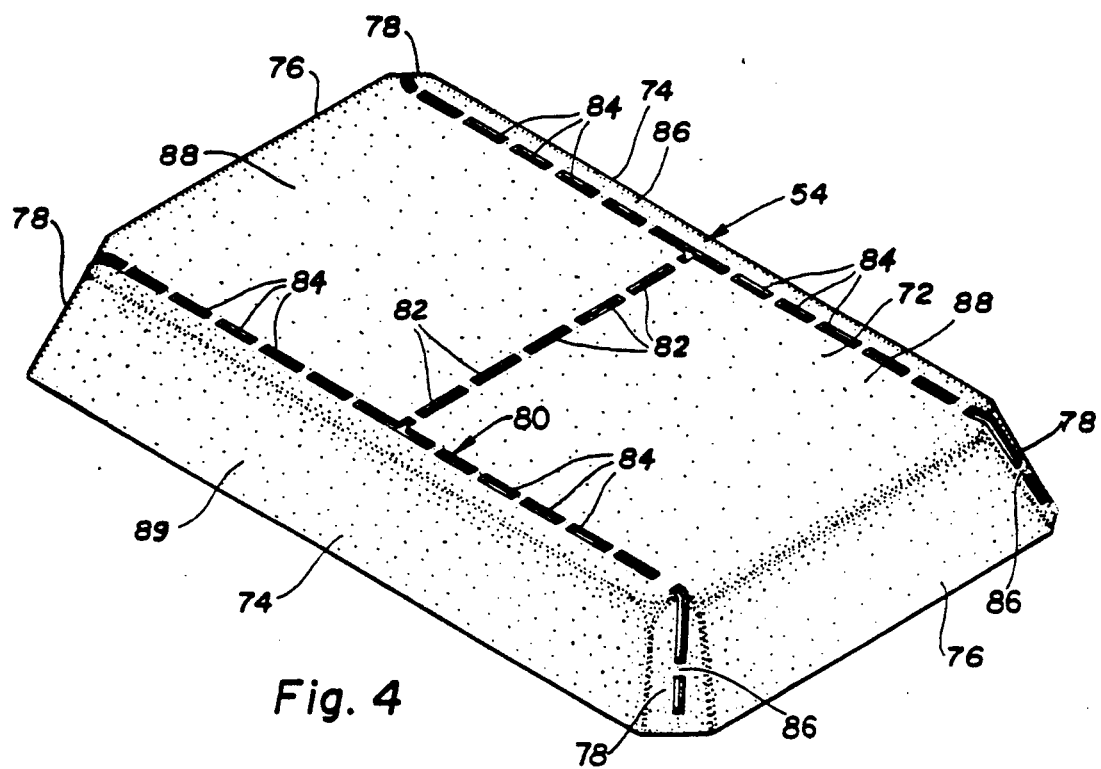
FIG. 4 is a perspective view of a container according to one embodiment of this invention.
Figure 5:
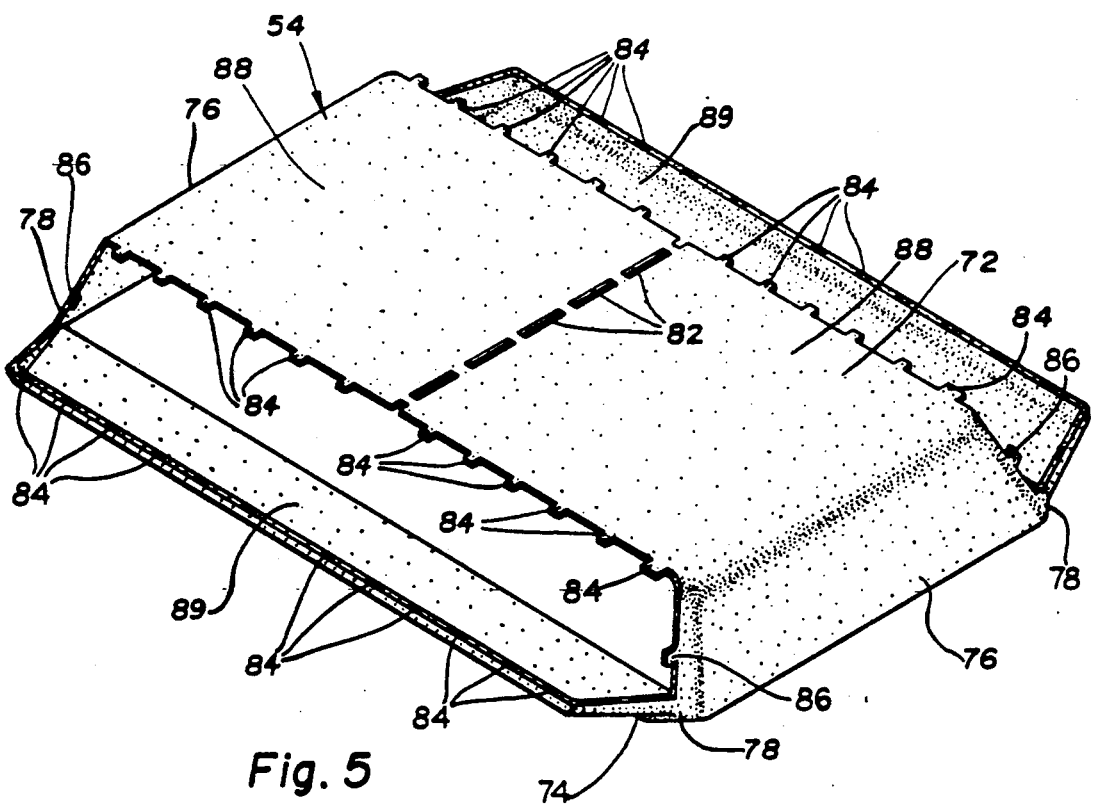
FIG. 5 is a view of the container of FIG. 4 with the pair of second flaps opened to permit initial deployment of the cushion, not shown, along alternate paths parallel to the driver.
Figure 6:
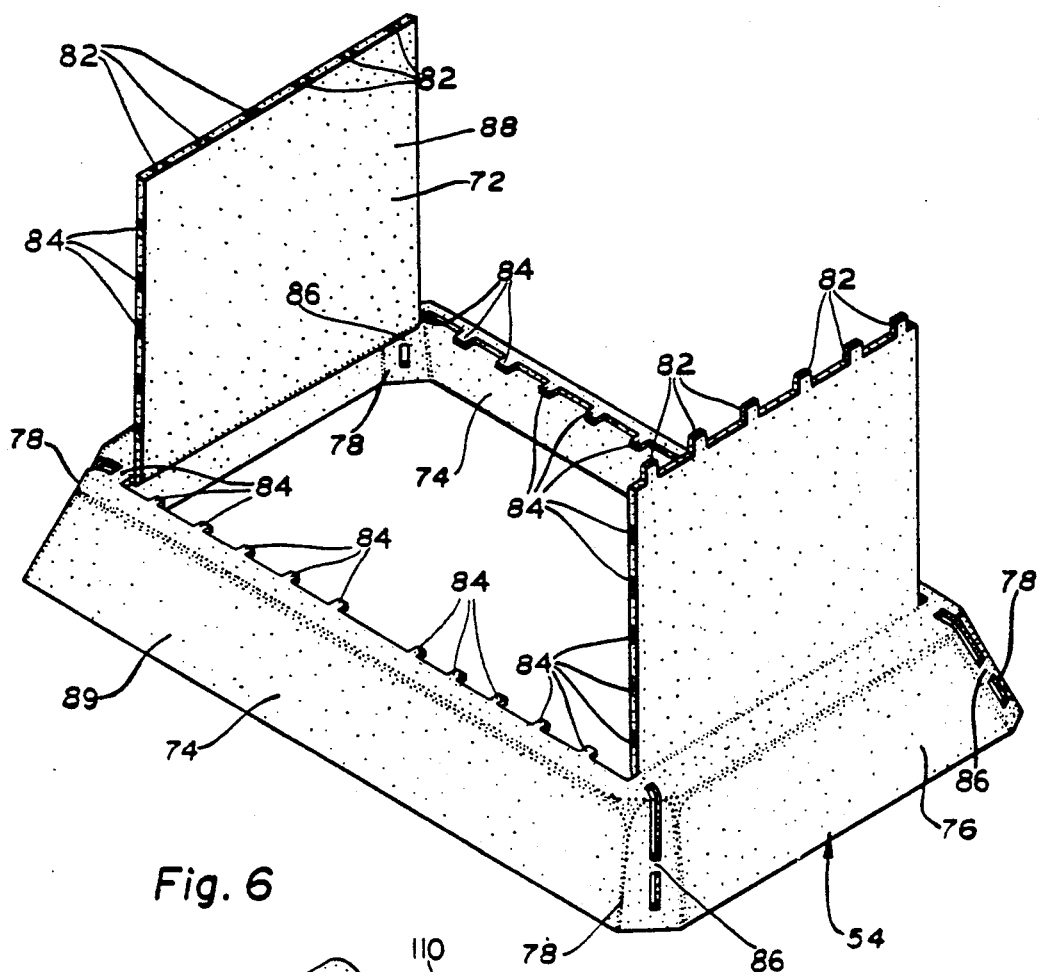
FIG. 6 is a view of the container of FIG. 4 with the pair of first flaps opened to permit deployment of the cushion, not shown, along the normal or intended path toward the driver.

As shown in FIGS. 4 through 6, the container 54 has a generally planar upper or base wall 72 which is integral with a pair of longer side walls 74 and a pair of shorter end or side walls 76, with the side edges of the pairs of side walls being integrally joined to each other at corners or junctures 78. The side walls 74 and 76 and the corners or junctures 78 are outwardly flared or slightly angular to the base wall 72. It will be understood that the system 20 is mounted to the steering wheel 24 with the base wall 72 facing the driver's torso, the side walls 74 extending transversely of the driver's torso, and the side walls 76 extending longitudinally of the driver's torso. Thus, the side walls 74 are alternately referred to as the 6 and 12 o'clock side walls and the side walls 76 are alternately referred to as the 3 and 9 o'clock side walls.

A generally elongated I-shaped tear line configuration in the container 54 includes first tear lines 80 and a second tear line 82, each tear line consisting of a line of perforations. The first tear lines 80 have their major portions 84 located in the base wall 72 adjacent the juncture of the longer sides of the base wall with each of the longer side walls 74 of the container. Each first tear line includes a pair of end extensions or continuations 86. The extensions 86 are shown as coplanar with the first tear lines 80. The extensions 86 terminate adjacent the lower or secured edge portions of the shorter side walls 76. In one modification, the extensions 86 may follow the peak lines of the corners 78 or be located adjacent such peak lines. In another modification, the extensions 86 may be in the form of slots or openings resulting from removal of all or part of the corners 78.

The major portions of the first tear lines and the second tear line define a pair of oppositely opening first flaps 88 which are hinged to the container about the junctures of the base wall 72 to the shorter side walls 76. The flaps 88 are moved to their open position, as shown in FIG. 6, by the diametrical portion of the inflating cushion 42 and permit deployment of the cushion 42 along its normal or intended path toward the driver. The cushion 42 is not shown in FIG. 6 for clarity.

The major portions of the first tear lines and extensions thereof, in all modifications of such extensions, define a pair of oppositely opening second flaps 89 which are hinged to the container about the lower or secured edge portions of such longer side walls 74, the junctures of the longer side walls to the flanges 56. The flaps 89 are moved to their open position as shown in FIG. 5 by the fan folded chordal portions of the inflating cushion 42 and permit initial deployment of the cushion 42 along an alternate path generally parallel to the driver and laterally of the container should the cushion be unable to initially deploy along its normal or intended path. The cushion 42 is not shown in FIG. 5 for clarity. Each flap 89 includes an entire side wall 74 of the container, the portion of the base wall 72 between a major tear line portion 84 and the upper edge of such side wall 74, and any parts of the corners 78 joined to or integral with such side wall 74.

As can be seen from FIG. 1, the cover 60 has molded in lines 90 and 92 in its forward or base wall 94, and molded in lines 96 in its shorter or 3 and 9 o'clock side walls 98. The side walls of the cover 60 overlie and are generally coextensive with the side walls of container 54. The molded in lines 90, 92, and 96 are respectively aligned with the lines of perforations 82, 84, and 86 of container 54. The lines 92 and 96 define a first pair of integrally hinged flaps 100 in the longer or 6 and 12 o'clock side walls of cover 60. The flaps 100 are respective to and generally coextensive with the underlying flaps 89 of container 54. The lines 90 and 92 define a second pair of integrally hinged flaps 102 in wall 94, these flaps being respective to and generally coextensive with the underlying flaps 88 of the container 54. The hinge lines or hinge axes of flaps 100 and 102 are generally aligned with those of their respective flaps 89 and 88 of container 54. The cover 60 is not shown in FIGS. 4 through 6 for clarity. The lines 92 and 96 may be used even though the extensions 86 follow the peak lines of corners 78, are adjacent such peak lines, or are in the form of slots resulting from removal of all or part of the corners 78.

Figure 7:
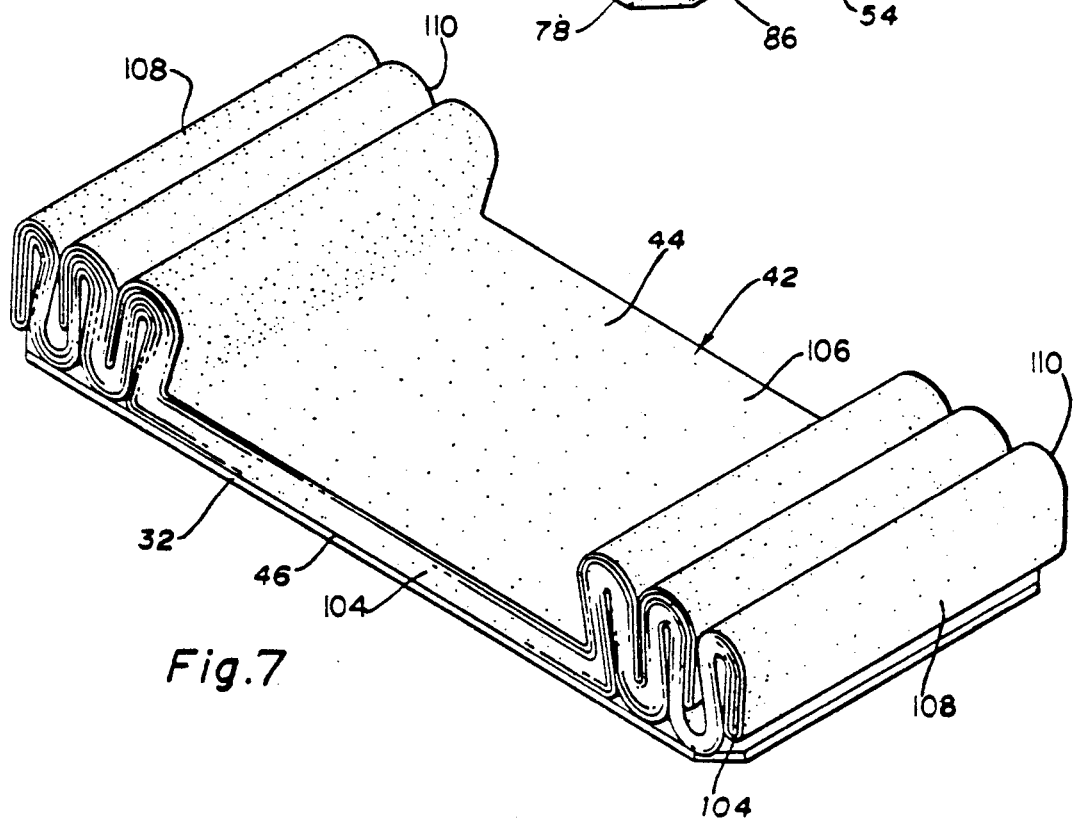
FIG. 7 is a perspective view of a folded and pleated cushion.

Referring now to FIG. 7, the cushion 42 will be described. The cushion 42 is of conventional construction and includes the circular cushion members 44 and 46 which are secured together along their circular edge portions. The cushion members 44 and 46 are folded as set forth in U.S. Pat. No. 4,903,986 Cok et al. to provide the fan folded chordal portions 104 and the diametrical portion 106. The cushion is then pleat folded at 110 to provide the fully folded cushion 42. This folded cushion is housed within the container 54 with the fan folded chordal portions of the cushion being located opposite the longer side walls 74 of the container and the pleat folded end portions 108 of the cushion being located opposite the shorter side walls 76 of the container, as shown in FIG. 2.

When the inflator 38 receives an appropriate electrical signal, the inflator generates gas which exits from the outlet portion 40 of the inflator, FIG. 2, into the folded cushion 42 through the opening 48 in the cushion member 46 to initiate inflation or deployment of the cushion. During normal deployment, the diametrical portion 106 of the inflating cushion 42 forcefully engages the base wall 72 of the container as the cushion 42 is initially inflated. This separates wall 72 along the lines of perforations 82 and 84 into the oppositely outwardly opening flaps 88, as shown in FIG. 6, which are integrally hinged to the upper edges of the side walls 76. This permits the cushion 42 to deploy along its normal or intended path toward the driver's torso as the fan folded chordal portions 104 unfold into continuations of the cushion members 44 and 46. The cover 60 and cushion 42 are not shown in FIG. 6 for clarity. The wall 94 of cover 60 separates into flaps 102 which are generally coextensive with flaps 88.

Should the cushion 42 be unable to initially deploy along its normal or intended path, such as by wall 94 being obstructed so that it and wall 72 cannot be separated into the flaps 88 and 102 by the force of the diametrical portion 106 against wall 72, the fan folded chordal portions 104 will start to unfold and exert pressure against the side walls 74 of the container. The force of the unfolding fan folded chordal portions 104 against walls 74 will separate these walls along the lines of perforations 84 and 86 into the oppositely opening integrally hinged flaps 89. The cover 60 will generally likewise separate along the lines 92 and 96 into the oppositely outwardly opening flaps 100 which open generally simultaneously with their respective flaps 89. This permits the fan folded chordal portions 104 of the cushion 42 to unfold outwardly through the resultant openings, along alternate paths generally laterally of the system 20 and parallel to the driver's torso. The force at which walls 74 separate into flaps 89 is determined by the material of the container, the thickness of the walls 74, the extent and spacing of the perforations of portions 84 and extensions 86, and whether extensions 86 are in the form of slots. Likewise, the depth of lines 92 and 96 and the material of the cover are selected so that the flaps 100 open generally simultaneously with the flaps 89.

Should the cushion 42 initially deploy through the flaps 89 and 100 parallel to the driver, the perforations of extensions 86 will have been severed with the perforations of the major portions 84 and the molded in lines 96 will have been severed with the molded in lines 92. When the cushion subsequently deploys through the flaps 88 and 102, the portions of the walls 76 between extensions 86 will open with flaps 88 as a unit therewith and the portions of walls 98 between lines 96 will open with flaps 102 as a unit therewith. The junctures 78 will prevent any hinging of flaps 88 relative to walls 76 so that the unitized flaps 88 and walls 76 will each open outwardly about the secured or lower edge portions of walls 76 to flange 56 and the unitized flaps 102 and walls 98 will each open outwardly about the secured or lower edge portions of walls 98. Thus, both flaps 88 and 102 will be enlarged by being unitized with the shorter walls of their respective container and cover should the cushion initially deploy through the flaps 89 and 100.

Although this invention has been shown and described with a container for the folded cushion and a cover for the container, it should be recognized that the container and cover can be unitized into one member forming both functions.

Thus, this invention provides an occupant restraint system which permits initial deployment of the cushion along alternate paths of deployment generally parallel to the driver's torso should the cushion be unable to deploy along its intended path toward the driver's torso.

The embodiments of the invention in which an exclusive property or privilege is claimed are defined as follows:

1. An occupant restraint system comprising, in combination, a support box-like container including a base wall and first and second pairs of spaced side walls joined to the base wall along upper edges thereof and joined to each other along side edges thereof, a folded inflatable occupant restraint cushion within the container, the cushion being folded to provide a first portion opposite the base wall of the container and spaced second portions, each cushion second portion being located opposite a respective side wall of the first pair of side walls, first separable means in the base wall of the container adjacent each juncture thereof with the upper edge of a side wall of the first pair, second separable means joining the first separable means intermediate the second pair of side walls and defining therewith a pair of oppositely opening separable first flaps in the base wall of the container hinged to the upper edges of the second pair of side walls, the first flaps being separable from the container and moved to open position by the first portion of the cushion upon initial inflation of the cushion to permit initial deployment of the cushion along an intended path toward the occupant, each first separable means including extensions located adjacent the side edges of the second pair of side walls, the first separable means and extensions thereof defining a pair of oppositely opening second flaps, each said second flaps including a side wall of the first pair hinged to the support about the lower edge thereof and the portion of the base wall joined thereto, should the first portion of the cushion be unable to open the first pair of flaps to permit initial deployment of the cushion along the intended path toward the occupant upon inflation of the cushion, the second portions of the cushion separating the second pair of flaps from the container and moving said second pair flaps to open position about the hinged lower edges of the first pair of side walls to permit initial deployment of the cushion along paths parallel to the occupant, the second pair of side walls moving with the first flaps to open position about the hinged lower edges of said second pair of side walls upon subsequent deployment of the cushion along the intended path toward the occupant.

2. An occupant restraint system comprising, in combination, a support, a box-like container including a base wall and first and second pairs of angular side walls having their upper edges joined to the base wall and their lower edges hinged to the support, the side walls being joined to each other by angular junctures at the side edges thereof, a folded inflatable occupant restraint cushion within the container, the cushion being folded to provide a first portion opposite the base wall of the container and spaced second portions, each cushion second portion being located opposite a respective side wall of the first pair, first linear separable means intermediate the second pair of side walls and defining therewith a pair of oppositely opening separable first flaps in the base wall of the container hinged to the upper edges of the second pair of side walls, the first flaps being separable from the container and moved to open position by the first portion of the cushion upon initial inflation of the cushion to permit initial deployment of the cushion along an intended path toward the occupant, each first linear separable means including extensions along the angular junctures between the joined side edges of the side walls, the first linear separable means and extensions thereof defining a pair of oppositely opening second flaps, each said second flaps including a side wall of the first pair hinged to the support about the lower edge thereof and the portion of the base wall joined thereto, should the first portion of the cushion be unable to open the first pair of flaps to permit initial deployment of the cushion along the intended path toward the occupant upon inflation of the cushion, the second portions of the cushion separating the second pair of flaps from the container and moving said second pair of flaps to open position about the hinged lower edges of the first pair of side walls to permit initial deployment of the cushion along paths parallel to the occupant, the second pair of side walls moving with the first flaps to open position about the hinged lower edges of said second pair of side walls upon subsequent deployment of the cushion along the intended path toward the occupant.

3. An occupant restraint system comprising, in combination, a support, a rectangular box-like container including a base wall, a first pair of longer side walls and a second pair of shorter side walls, the side walls having their upper edges joined to the base wall and their lower edges hinged to the support, the side walls being joined to each other along the side edges thereof, a folded inflatable occupant restraint cushion within the container, the cushion having a first portion opposite the base wall of the container and second portions, each cushion second portion being located opposite a respective longer side wall of the container, first linear separable means intermediate the shorter side walls and defining herewith a pair of oppositely opening separable first flaps in the base wall of the container, each first flap being hinged to the upper edges of a shorter side wall, the first flaps being separable from the container and moved to open position by the first portion of the cushion upon initial inflation of the cushion to permit initial deployment of the cushion along an intended path toward the occupant, each first linear separable means including extensions located adjacent the side edges of the shorter side walls, the first linear separable means and extensions thereof defining a pair of oppositely opening second flaps, each second flaps including a longer side wall hinged to the support about the lower edge thereof and the portion of the base wall joined thereto, should the first portion of the cushion be unable to open the first pair of flaps to permit initial deployment of the cushion along the intended path toward the occupant upon inflation of the cushion, the second portions of the cushion separating the second pair of flaps from the container and moving such flaps to open position about the hinged lower edges of the longer side walls to permit initial deployment of the cushion along paths parallel to the occupant, the shorter side walls moving with the first flaps to open position about the hinged lower edges of such shorter side walls upon subsequent deployment of the cushion along the intended path toward the occupant.

4. An occupant restraint system comprising, in combination, a support, a box-like rectangular container including a base wall, a first pair of long side walls and a second pair of short side walls having their upper edges joined to the base wall and their lower edges hinged to the support, the side walls being joined to each other along the side edges thereof, a folded inflatable occupant restraint cushion within the container, the cushion being folded to provide a first portion opposite the base wall of the container and spaced second portions, each cushion second portion being located opposite a respective long side wall, first separable means in the base wall of the container adjacent each juncture thereof with the upper edge of a long side wall, second separable means extending between the first linear separable means intermediate the short side walls and defining therewith a pair of oppositely opening separable first flaps in the base wall of the container, each first flap being hinged to the upper edges of a short side wall, the first flaps being separable from the container and moved to open position by the first portion of the cushion upon initial inflation of the cushion to permit initial deployment of the cushion along an intended path toward the occupant, each first separable means including extensions extending across a short side wall adjacent a side edge thereof the first separable means and extensions thereof defining a pair of oppositely opening second flaps, each second flap including a long side wall hinged to the support about the lower edge thereof and the portion of the base wall joined thereto, should the first portion of the cushion be unable to open the first pair of flaps to permit initial deployment of the cushion along the intended path toward the occupant upon inflation of the cushion, the second portions of the cushion separating the second pair of flaps from the container and moving such flaps to open position about the hinged lower edges of the long side walls to permit initial deployment of the cushion along paths parallel to the occupant, the short side walls moving with the first flaps to open position about the hinged lower edges of such short side walls upon subsequent deployment of the cushion along the intended path toward the occupant.

* * * * *

UNITED STATES PATENT AND TRADEMARK OFFICE
CERTIFICATE OF CORRECTION

PATENT NO. : 5,013,064

DATED : May 7, 1991

INVENTOR(S) : Robert L. Jones, Centerville, Ohio; Gregory A. Miller, Troy; Jeffery L. Pearson, Rochester, both of Michigan It is certified that error appears in the above-identified patent and that said Letters Patent is hereby corrected as shown below:

Title page, column 1, list of inventors, before "Gregory A. Miller", insert -- Robert L. Jones, Centerville, Ohio --.

Item [19] "Miller et al" should read --Jones, et al--.

Signed and Sealed this

Twenty-second Day of December, 1992

Attest:

DOUGLAS B. COMER

Attesting Officer      Acting Commissioner of Patents and Trademarks